Sept. 1, 1959     D. C. GOFF     2,901,775
METHOD OF INSULATING PIPE
Filed Sept. 7, 1954
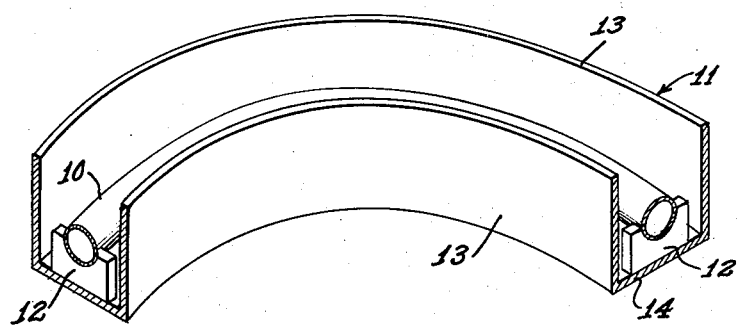
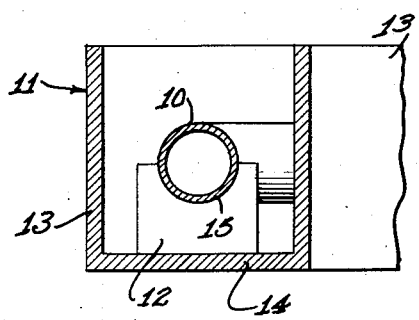 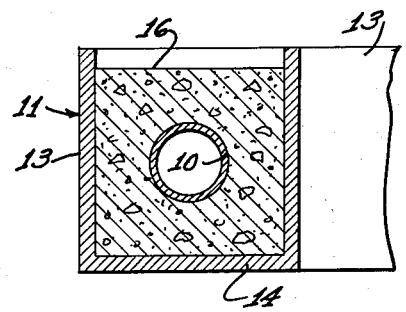
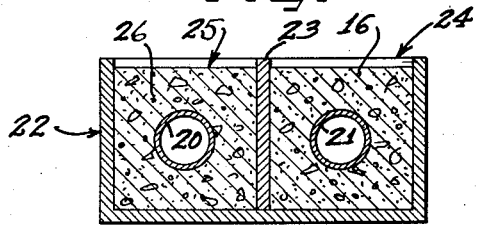 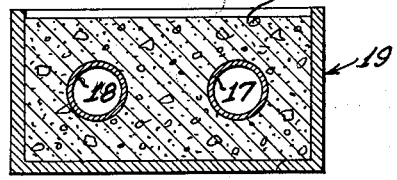
Inventor
DAVID C. GOFF

United States Patent Office 2,901,775
Patented Sept. 1, 1959

2,901,775

METHOD OF INSULATING PIPE

David C. Goff, La Grange, Ill., assignor to Zonolite Company, Chicago, Ill., a corporation of Montana Application September 7, 1954, Serial No. 454,550

6 Claims. (Cl. 18—59)

The present invention relates to a new and improved form of insulated conduit assembly and a method of making same.

More particularly it relates to a new and improved method for insulating pipes which carry hot and cold fluids at various times and are, therefore, subjected to intermittent expansion and contraction.

Expansion and contraction of pipes caused by temperature variations is one of the major problems encountered in insulating such conduits. This is especially true in regard to extensive lengths of pipe having bends, loops or similar curved portions therein.

In most conventional methods of applying pipe insulating materials it is possible to provide means for allowing limited radial expansion and contraction. This is usually effected by wrapping the pipe with a soft, resilient material, such as cardboard, paper, or the like prior to investing the pipe in the insulating material. In the use of very few of the conventional pipe insulating materials, however, it is possible to compensate adequately for axial expansion and contraction of the pipe within the insulating investment. This is especially with regard to pipe movement at bends, loops, curves and the like.

Accordingly, it has been common practice heretofore to invest straight lengths of pipes in an integral or monolithic insulating material while with bends, curves, loops and the like have been provided with a separate form of insulation structure which allows pipe movement through expansion and contraction.

The conventional structure most often used to accommodate the insulation of curved pipes comprises a box formed about the curvature of the pipe. A granular or fibrous insulating material, such as shredded cork, glass wool, steel wool, or the like is packed around the curved portion of the pipe and is retained in place by the box-like retaining structure.

This method of insulating curved portions of pipes, however, has not been found to be entirely satisfactory. This is due primarily to the lack of resilience displayed by loose granular or fibrous insulating materials, for when a pipe expands at a curve or the like, the general axial movement of the pipe forces the insulating material outwardly. When the pipe contracts, the insulating material, due to lack of resilience, fails to return to its original position around the pipe. This results in a pocket or air space between the pipe and the insulating material. After a sufficient number of expansions and contractions, the movement of the pipe and the concomitant packing down of the insulating material at the curved portion of the pipe results in a gap between the pipe and the insulating material along the entire length of the curved portion. When this has occurred the insulating ability of the material at the curved portion is reduced to minimum efficiency.

This problem of efficiently insulating curved pipes is especially acute in pipes which, at various times, are employed intermittently to conduct hot and cold fluids, for such pipes are subjected to extreme expansion and contraction.

I have found that it is now possible to invest a pipe in an insulation material having sufficient elasticity and resilience such that said insulation material can be compressibly deformed under pipe expansion and contraction without permanently losing its initial conforming shape. The resilient nature of this insulation material allows the insulation to follow the movement of a pipe and will not result in the formation of a pocket or gap between the pipe and the insulation. The resilient and elastic nature of the instant insulation material makes it especially suitable for use in insulating bends, loops, and other curved portions of pipe, such as expansion loops or the like, wherein pipe movement due to expansion and contraction is often quite extensive.

This resilient and elastic insulating material comprises a mixture of a light-weight aggregate and a waterproof, thermoplastic binder material wherein the individual particles of the aggregate are uniformly coated with the binder and the volume of the mixture has been decreased to a predetermined amount over its as-mixed state by mechanically compacting said mixture around the pipe.

In accordance with the foregoing an object of the present invention is to provide a new and improved method for insulating pipes and similar conduits.

Another object is to provide a method for insulating a pipe which is intended to conduct hot and cold fluids, respectively, at various times.

Still a further object is to provide a new and improved insulating material having sufficient elasticity and resilience to permit the insulation to be compressibly deformed under pipe expansion and contraction without the insulating material losing its initial conformity to the pipe and its efficiency of insulation.

Still another object is to provide a new and improved method for insulating curved portions of pipes, such as bends, loops and the like which is unaffected in its insulating ability by pipe movement.

Yet another object is to provide a new and improved insulating material which comprises a mixture of a light-weight aggregate and a thermoplastic binder material wherein the individual particles of said aggregate are uniformly coated with said binder and the volume of the material has been decreased by at least 10 percent over its as-mixed state by mechanically compacting the material around the pipe to be insulated.

Other objects and advantages of the instant invention will be apparent from the following detailed description of a preferred embodiment thereof taken in conjunction with the annexed sheet of drawings wherein:

Figure 1 is a perspective view of a curved section of pipe mounted in an insulation-retaining form;

Figure 2 is an enlarged end view of the structure shown in Figure 1 illustrating the manner in which the pipe is supported;

Figure 3 is similar to Figure 2 showing the pipe invested in the insulating material of the instant invention;

Figure 4 is a cross sectional view of a pair of parallel pipes insulated in accordance with the method of instant invention; and, Figure 5 is a cross sectional view of a pair of insulated parallel pipes having a common party wall therebetween, wherein one pipe has been insulated in accordance with the method of the instant invention.

In accordance with the instant invention, a pipe 10 is supported in spaced relationship from the sides and floor of a suitable insulation-retaining form 11 by means of suitable support members or stanchions 12.

The pipe 10, may be curved or straight. Since the instant invention is especially applicable to insulating curved pipes or portions thereof, the pipe 10 in the drawings is shown as having an arcuate configuration.

The insulation-retaining form 11 comprises a generally U-shaped channel having parallel, opposed side wall members 13, 13 and a bottom member 14. The stanchion 12 employed in supporting the pipe 10 in spaced relationship from the side walls 13, 13 and the bottom member 14 of the insulation-retaining form 11 comprises a substantially rectangular member having a semi-circular or arcuate cut-out portion 15 formed on the top edge thereof. The cut-out portion 15 supports and retains the pipe 10 against radial movement in the form 11 during the insulating process. Although substantially any material may be used to form the stanchion 12, it is preferred that a non-conducting material, such as insulating concrete or the like be employed.

After the pipe 10 has been suitably supported in the form 11, the insulating material 16 of the instant invention is poured into the form 11 to completely surround and invest the pipe 10. The insulating material 16 is thereafter tamped down or otherwise mechanically agitated and compacted until the volume thereof has been reduced at least ten percent over the as-mixed volume of the insulating material. The reason for this tamping down and reduction in volume of the insulating material 16 will be more clearly brought out as the disclosure proceeds.

The insulating material 16 comprises a mixture consisting essentially of a light weight aggregate and a waterproof thermoplastic binder wherein the individual particles of the aggregate have been uniformly coated with the binder.

Examples of light weight aggregates which may be employed in producing the insulating material 16 are expanded or exfoliated vermiculite, pumice, perlite, scoria, haydite or other aggregates of a porous character. For the purposes of this invention, however, expanded vermiculite and perlite are the preferred aggregates.

Examples of thermoplastic materials which may be used are the so-called bitumen thermoplastic materials such as asphalts, both of natural and petroleum origin, and steam refined as well as air-blown, coal tars, coal tar pitches, and natural and synthetic thermoplastic resins such as the vinyl resins. The bitumen thermoplastic materials, however are preferred.

The light weight aggregate may be admixed with the thermoplastic binder to produce discrete particles of the coated aggregate in a number of different ways. One suitable way, as set forth in U.S. Patent Number 2,565,107, contemplates the rapid and intimate intermixing of a hot fluid thermoplastic material of the character described with a suitable amount of the light aggregate which has been previously slightly dampened by the addition thereto of a suitable volatile liquid such as water and the like.

An example of this method is as follows:

500 grams of expanded vermiculite passing a number 3 sieve (U.S. Standard) and retained on a number 10 sieve were dampened with a minimum amount (55 cc.) of water. This dampened aggregate was then mixed into 500 grams of molten air blown asphalt (160° F. melting point) the temperature of which was 500° F. After one minute of mixing with a mechanical paddle mixer, during which steam was released, the aggregate was found to be completely and uniformly coated and the temperature of the mixture had been reduced to 180° F. by the moisture evaporation.

The exact method employed in coating the light weight aggregate particles with the thermoplastic binder is not critical and may be achieved in any suitable manner. For example, an alternative method would be to spray an aqueous bitumen emulsion on heated particles of the aggregate while the aggregate particles were suspended in a current of air. By this method each and every discrete particle would be intimately and uniformly coated with the emulsion.

The ratio of light weight aggregate to the thermoplastic binder material employed in the insulating mixture may vary within certain limits. The main requirement is that the individual particles of the light weight aggregate be coated with a sufficient quantity of the thermoplastic binder to allow the coated aggregate particles to be mechanically agitated or worked to form an integral or coalesced mass displaying the desired insulating properties.

In general, about equal parts by weight of aggregate and thermoplastic material will be most suitable for the purposes.

After the mixture of the light weight aggregate and thermoplastic material has been poured around the pipe 10 in the form 11, it is necessary that the insulating mixture be tamped down or otherwise mechanically compacted until the volume of the insulating material has been reduced at least 10 percent as compared to its original as-mixed volume.

In general, a volume reduction by tamping of from about 10 to 25% as compared to the original mixture is operable. Within this broader range, a volume reduction of from about 12% to 20% is even more desirable. For most pipe insulating purposes, however, a volume reduction of about 15% is best.

This volume reduction of the insulating material by tamping or the like, is of primary importance and one of the controlling factors in developing the resilient and elastic nature of the insulation material.

Individual particles of a light-weight aggregate, such as exfoliated vermiculite, have a fluffy, porous and resilient nature such that under slight pressures such particles are capable of acting not unlike a spring. As with most granular materials, however, light-weight aggregates, especially vermiculite, tend to pack down under repeated mechanical pressure, and by themselves are not satisfactory insulating media for pipes subject to repeated expansion and contraction. Merely coating vermiculite with a thermoplastic binder, in and of itself, does not diminish the tendency of vermiculite toward packing.

However, if particles of vermiculite which have been mixed and coated with a thermoplastic binder are compacted around a pipe so that the volume of the mixture disposed about the pipe is at least 10% less than in its as-mixed state, the tendency toward packing is eliminated and a resilient, elastic insulating material is obtained.

Apparently what happens is that the compacting causes each resilient coated particle in the investment mixture to adhere tightly to adjacent particles through the adhesive medium of the thermoplastic binder coating contained on each particle. The compacting, likewise, causes the coated particles immediately adjacent the pipe to adhere tightly to the pipe surface.

In reality, then, the compacted mixture comprises a large number of interconnected spring-like particles mounted about and on the surface of a pipe and which are capable of co-movement with the pipe without packing down or losing their original pipe conforming shape and properties whether being expanded or compressed.

If the aggregate binder mixture is compacted to a volume reduction of less than 10% of its as-mixed volume, there is insufficient adherence of the individual particles to one another and the proper resilience is not obtained. On the other hand, if compacting exceeds about a 25% reduction over the as-mixed volume, many of the individual aggregate particles will be crushed and resilience and insulating efficiency will be reduced. Therefore, compacting to a volume reduction of from about 10% to 25% over the as-mixed state is preferred.

After the insulating material 16 has been poured and mechanically compacted around the pipe 10, a heated fluid may be passed through the pipe 10 to dry out the insulating material 16 if desired. When insulating a pipe which carries hot and cold liquids respectively at various times, it will, of course, be appreciated that hot fluid would be passed through the pipe first to effect this drying.

It is to be noted, however, that a minimum amount of water is added to the insulating mixture and, therefor, in many instances it is not necessary to dry out the insulating material by means of heat, for normal atmospheric conditions will effect adequate drying.

Accordingly, since the insulating material 16, contains but a small percentage of moisture, it may be applied to pipes carrying cold fluids, since the amount of moisture retained by it is not sufficient to impair the insulating properties of the material.

The instant material and method may also be employed in insulating juxtaposed or closely parallel pipes carrying fluids at various temperatures. As illustrated in Figure 4, a pipe or similar conduit 18, carrying fluid at elevated temperatures such as steam or hot water, and a pipe 17 carrying fluids at low temperatures, such as brine or the like, are embedded in an integral or unitary investment of the insulating material 16 of the instant invention. The insulating material 16, is formed around the pipes 17 and 18 by means of the insulation-retaining form shown generally at 19 and is mechanically agitated to compact it to the predetermined volume reduction as described previously. In this embodiment it would be preferred that the heated fluid, such as steam, would be first passed through the pipe 18 to dry out the insulating investment 16. This drying out of the insulating material 16 would reduce the transference of heat from the pipe 18 to the colder pipe 17 that would otherwise possibly occur due to moisture present in the insulation.

A further modification is illustrated in Figure 5, wherein a pipe 20 carrying a fluid at elevated temperatures, such as steam or the like, and a pipe 21 carrying fluids at reduced temperatures, such as brine or the like, are both retained generally in an insulation-retaining form shown generally at 22. The pipes 20 and 21 are separated, however, by an up-standing longitudinally extending common party wall 23 which divides the insulation-retaining form 22 into two separate compartments 24 and 25. The insulating material 16 of the instant invention, which is particularly adaptable to insulating pipes carrying fluids at reduced temperatures, is compacted around the pipe 21 in the right hand compartment 24. The pipe 20, on the other hand, which carries fluids at elevated temperatures, is retained in the lefthand compartment 25 and is invested in a conventional insulating material 25, such as any of the light weight insulating concretes or the like commonly used for this purpose. In this manner it is possible to insulate juxtaposed or closely parallel pipes carrying fluids at different temperatures without the necessity of drying out the insulating material before the system may be used.

The heat from the fluid in the pipe 20 will dry out the standard insulating material 25 in the compartment 26 during normal use, while, as noted previously, the percentage of moisture contained in the insulating material 16 of the instant invention is insufficient so significantly reduce the insulating efficiency of the material and need not be dried out before using the pipe.

The insulating material and method of the instant invention may be employed in insulating underground pipe assemblies or overhead pipe assemblies. In either case, the insulation-retaining form, such as 11, in which the pipe is supported, may be allowed to remain affixed to the insulation material or may be removed.

In underground installations the insulating material 16 compacted around the pipe is preferably furnished with a protective layer or covering, such as felts and pitch or the like to prevent breakdown of the insulating material by water or the chemical action of soil. In overhead pipe installations which are protected from the elements, it is not necessary to provide the outer surface of the insulating material 16 with a protective coating. However, where the overhead pipe installations are exposed to adverse conditions, such as out of doors, or are otherwise subjected to excessive moisture or caustic chemical reagents, it is desirable to provide the insulating material with a protective coating such as the felts and pitch employed in underground installations or some similar protective means.

It will be apparent to those skilled in the art, that I have now provided a new and improved method for insulating pipes with an insulation investment having sufficient elasticity and resilience to permit the installation to be compressibly deformed under pipe expansion and contraction without the insulating material permanently losing its initial conforming shape and resilience.

It will be appreciated that the instant invention is applicable to either pipes carrying fluids at elevated temperatures or at reduced temperatures and is especially suitable for insulating cold pipes and pipes which at various times carry hot and cold fluids respectively.

It will also be appreciated that various modifications and changes may be effected in the instant invention without departing from the novel scope thereof.

I claim as my invention:

1. The method of insulating a pipe which comprises supporting said pipe in spaced relation to a retaining form, filling the space between said pipe and said form with a mass of discrete particles of a light-weight aggregate coated with a thermoplastic binder which is deformable under pressure, and compacting the coated aggregate particles to reduce the volume of said mass by a value of 10% to 25% of the original volume to produce thereby a resilient insulating jacket about said pipe.

2. The method of claim 1 in which said light weight aggregate is vermiculite.

3. The method of claim 1 in which said light weight aggregate is perlite.

4. The method of claim 1 in which said thermoplastic binder is a bituminous thermoplastic binder.

5. The method of claim 1 in which said thermoplastic binder is asphalt.

6. The method of claim 1 in which said thermoplastic binder is coal tar.

References Cited in the file of this patent

UNITED STATES PATENTS

| Number | Name | Date |
| --- | --- | --- |
| 1,281,408 | Marquess | Oct. 15, 1918 |
| 1,387,067 | Murray | Aug. 9, 1921 |
| 1,520,840 | Murray | Dec. 30, 1924 |
| 1,534,134 | Murray | Apr. 21, 1925 |
| 1,600,696 | Murray | Sept. 21, 1926 |
| 1,744,102 | Burke | Jan. 21, 1930 |
| 1,991,393 | Joyce | Feb. 19, 1935 |
| 2,009,811 | Olsen | July 30, 1935 |
| 2,009,812 | Olsen | July 30, 1935 |
| 2,077,094 | Byers | Apr. 13, 1937 |
| 2,355,966 | Goff | Aug. 15, 1944 |
| 2,410,308 | Scharwath | Oct. 29, 1946 |
| 2,532,587 | Williamson | Dec. 5, 1950 |
| 2,774,383 | Kidd | Dec. 18, 1956 |